(12) United States Patent
Whitehead

(10) Patent No.: US 7,230,809 B2
(45) Date of Patent: Jun. 12, 2007

(54) SYSTEM FOR CHECKING SYNCHRONIZATION OF AC VOLTAGE SOURCES BEFORE CLOSING A POWER CIRCUIT BREAKER

(75) Inventor: David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 592 days.

(21) Appl. No.: 10/872,628

(22) Filed: Jun. 21, 2004

(65) Prior Publication Data

US 2005/0280966 A1    Dec. 22, 2005

(51) Int. Cl.
*H02H 3/00* (2006.01)
(52) U.S. Cl. ........................................ 361/62
(58) Field of Classification Search ............... 361/62
See application file for complete search history.

(56) References Cited

U.S. PATENT DOCUMENTS

| | | | |
|---|---|---|---|
| 4,797,833 A * | 1/1989 | El-Amawy et al. ........... 702/60 |
| 4,807,102 A * | 2/1989 | Serras-Paulet ............... 363/37 |
| 6,324,039 B1 | 11/2001 | Gross, Jr. |
| 6,518,767 B1 | 2/2003 | Roberts et al. |
| 6,608,742 B2 | 8/2003 | Schweitzer, III et al. |
| 6,678,134 B2 | 1/2004 | Sugiura et al. |
| 6,785,105 B2 | 8/2004 | Roberts |
| 2002/0146083 A1 | 10/2002 | Lee et al. |
| 2003/0078745 A1 | 4/2003 | Roberts |

OTHER PUBLICATIONS

H. W. Lensner, Pilot Channels for Protective Relaying, Applied Protective Relaying, Chapter 15, Westinghouse Corporation, Library of Congress No. 76-8060, 1976.
R. E. Ray, Transmission Line Relaying: Pilot Relaying and Tripping Systems for Circuit Breakers, Applied Protective Relaying, Chapter 16, Westinghouse Corp., 1976.
Edith Clarke, Symetrical Components—Basic Equations For Three-Phase Systems, Circuit Analysis of A-C Power Systems, vol. I, 1943.

\* cited by examiner

*Primary Examiner*—Stephen W. Jackson
(74) *Attorney, Agent, or Firm*—Cook, Alex, McFarron, Manzo, Cummings & Mehler, Ltd.

(57) ABSTRACT

A system for checking synchronization of AC voltage sources before closing a power circuit breaker is provided comprising two power circuit breakers connected by a power transmission line, such as by using remote voltage via fiber channel. Each circuit breaker is respectively connected to a bus and a protective relay. The circuit also comprises voltage transformers between the bus and the protective relay. The protective relays monitor the voltages on the bus side of the circuit breakers and current flowing through the circuit breakers in order to detect short circuits on the line. A bidirectional communications link is further provided for connecting protective relays together.

29 Claims, 4 Drawing Sheets

SYSTEM FOR CHECKING SYNCHRONIZATION OF AC VOLTAGE SOURCES BEFORE CLOSING A POWER CIRCUIT BREAKER

BACKGROUND OF THE INVENTION

The present invention generally relates to power circuit breakers and, more specifically, to a system for checking synchronization of AC voltage sources before closing a power circuit breaker.

FIG. 1 shows a prior art AC electric power system comprising a power circuit breaker 2, a protective relay 4, bus 6, and a pair of voltage transformers 8a, 8b on each side of the circuit breaker. This basic system may be connected to another similar system via a transmission line 10. During faults, including any short circuit, the power circuit breaker 2 opens and interrupts the short circuit current, thereby limiting damage done to the power system. In order to resume power flow across the AC power system, the circuit breaker 2 must be closed. Before the circuit breaker 2 is closed, a synchronism check or sync-check is typically performed by the protective relay 4.

During a sync-check, the protective relay 4 typically compares attributes of the voltages on one side of the circuit breaker 2 to the same attributes of voltages on the other side of the circuit breaker 2 in order to ensure that the voltages of the lines connected to the circuit breaker 2 are synchronized when they are energized. If the circuit breaker 2 is allowed to close when the voltages are not synchronized, equipment damage and power system instability may ensue. Accordingly, the protective relay 4 signals the circuit breaker 2 to close only when the voltages are in synch and the circuit breaker should be closed. If the voltages are not synchronized, signaling from the protective relay 4 to the circuit breaker 2 is prevented.

A sync-check typically compares attributes of the voltages on one side of the circuit breaker to the same attributes of voltages on the other side of the circuit breaker. For example, a sync-check may compare the vector difference of the voltages on the two sides of the circuit breaker. U.S. Pat. No. 6,324,039 describes one method and arrangement in which the difference voltage is representative of the voltage angle of the generator relative to the electrical system. The difference voltage is compared against a reference value, which is selected such that a voltage angle value greater than the reference value will result in damage to the generator and/or electrical system. An output signal is developed which can then be used to trip circuit breakers serving the electrical system if the reference value is exceeded by the difference voltage. Other systems for performing such sync-checks are well known in art.

In systems having three or more voltages connected to each side of the circuit breaker, sync-checks are still performed on a single voltage from each side of the circuit breaker. For example, in a three-phase power system, three voltages would be connected to each side of the power circuit breaker. In this arrangement, usually only one voltage from each side of the circuit breaker is compared.

In order to perform a sync-check, attributes such as magnitudes, relative phases, or slips of at least one voltage from each side of the circuit breaker must be ascertained. For example, referring again to the conventional AC electric power system of FIG. 1, the voltages from both sides of the circuit breaker 2 are measured via step-down voltage transformers 8a, 8b by the protective relay 4 responsible for making the sync-check.

In an effort to save space and costs, it is a common practice that the step-down voltage transformers 8a, 8b only be installed on one side of the circuit breaker 2. For example, FIG. 2 illustrates such an arrangement whereupon a power system comprises two circuit breakers 12a, 12b connected by a power transmission line 14. As in the arrangement in FIG. 1, each circuit breaker 12a, 12b in the prior art arrangement of FIG. 2 is respectively further connected to a bus 16a, 16b and a protective relay 18a, 18b. This circuit further comprises voltage transformers 20a, 20b between the bus 16a, 16b and the protective relay 18a, 18b. Nevertheless, voltage transformers are not installed on the line 14 connecting the two circuit breakers, thereby compromising the ability for the protective relay 18a, 18b to perform the necessary sync-checks. Although economical, this arrangement increases the risk of equipment damage and power system instability due to the inability to perform a sync-check.

Therefore, it is an aspect and object of this invention to provide a system for performing a sync-check despite not having voltage transformers being connected to one side of the circuit breaker.

These and other desired benefits of the preferred embodiments, including combinations of features thereof, of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the preferred embodiments of the invention, not necessarily the invention in general.

SUMMARY OF THE INVENTION

In view of the desired goals of the invention specified herein, a system for checking synchronization of AC voltage sources before closing a power circuit breaker comprising two power circuit breakers connected by a power transmission line. Each circuit breaker is respectively further connected to a bus and a protective relay. The circuit further comprises voltage transformers between the bus and the protective relay. The protective relays monitor the voltages on the bus side of the circuit breakers and current flowing through the circuit breakers in order to detect short circuits on the line. A bidirectional communications link is further provided for connecting protective relays together, such as a fiber optic link.

Voltages are sampled via a sampling system comprising at least a voltage transformer. The voltage samples are then processed by the local relay and transmitted to a remote relay. The remote relay performs an identical function, and the samples transmitted by the remote relay are received and processed by the local relay. The samples transmitted to the remote relay and the positive-sequence samples received from the remote relay are additionally processed by the local relay to compensate for the processing and communications channel delay. Alternatively, the phase values could be received and the positive sequence could then be calculated from these phase values. After delay between the voltage samples are compensated for, the resulting voltages are then used to perform a sync-check function.

If the sync-check function determines that the voltages are synchronized, a signal is sent to close supervision logic. Upon receiving the signal from the sync-check function and a circuit breaker close request, the close supervision will send a close command to the circuit breaker.

Positive-sequence voltage calculations are further provided where a composite of voltages from each bus is used. Generally, this arrangement uses positive-sequence voltage signals to check for synchronization between the sets of multiple bus voltages before closing the circuit breaker.

DESCRIPTION OF THE PREFERRED EMBODIMENTS

Figure 1:
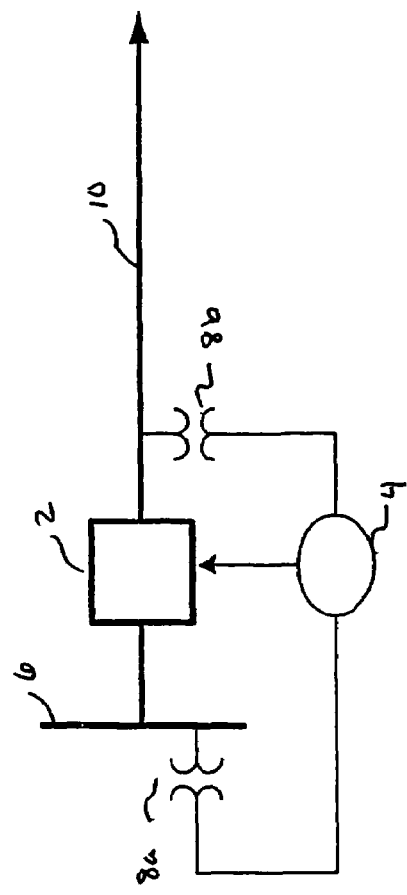
FIG. 1 is a schematic drawing showing a prior art circuit arrangement for synchronization checks having voltage transformers connected to each side of the circuit breaker.

Protective relays are commonly used for protecting, monitoring, controlling, metering and/or automatic control of the electric power system and the power transmission lines incorporated therein. As described in reference to the prior art system of FIG. 1, protective relays have also been adapted to perform sync-checks prior to the closing of circuit breakers when voltage transformers are connected to each side of the circuit breaker. Nevertheless, conventional protective relays cannot perform a sync-check when voltage transformers are connected to only one side of the circuit breaker.

Figure 3:
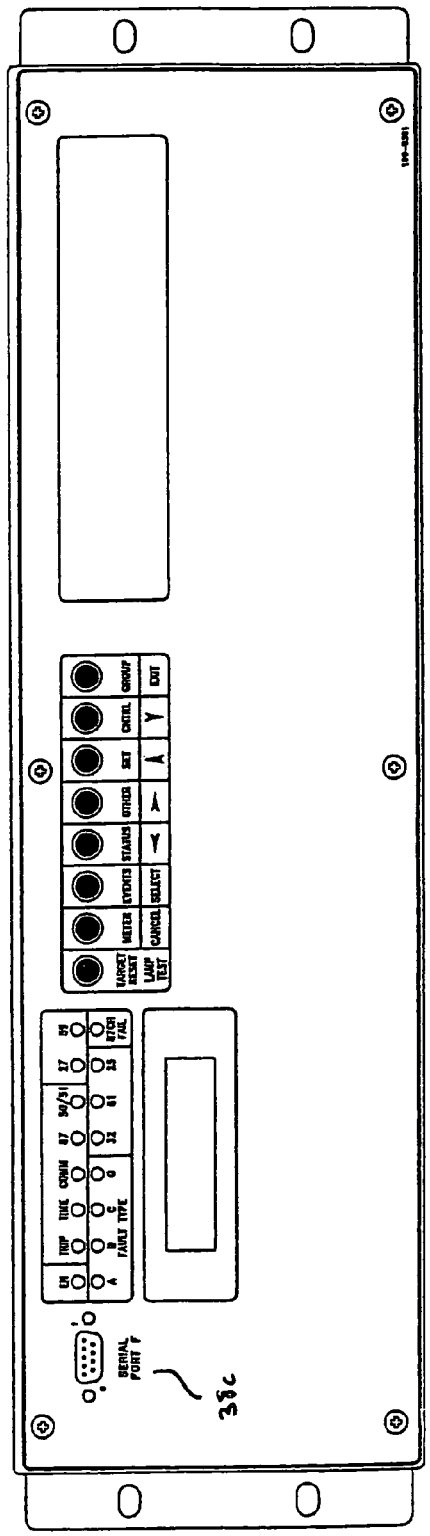
FIG. 3 is a front view of a protective relay for performing a sync-check adapted for use in the present invention circuit arrangement.
Figure 4:
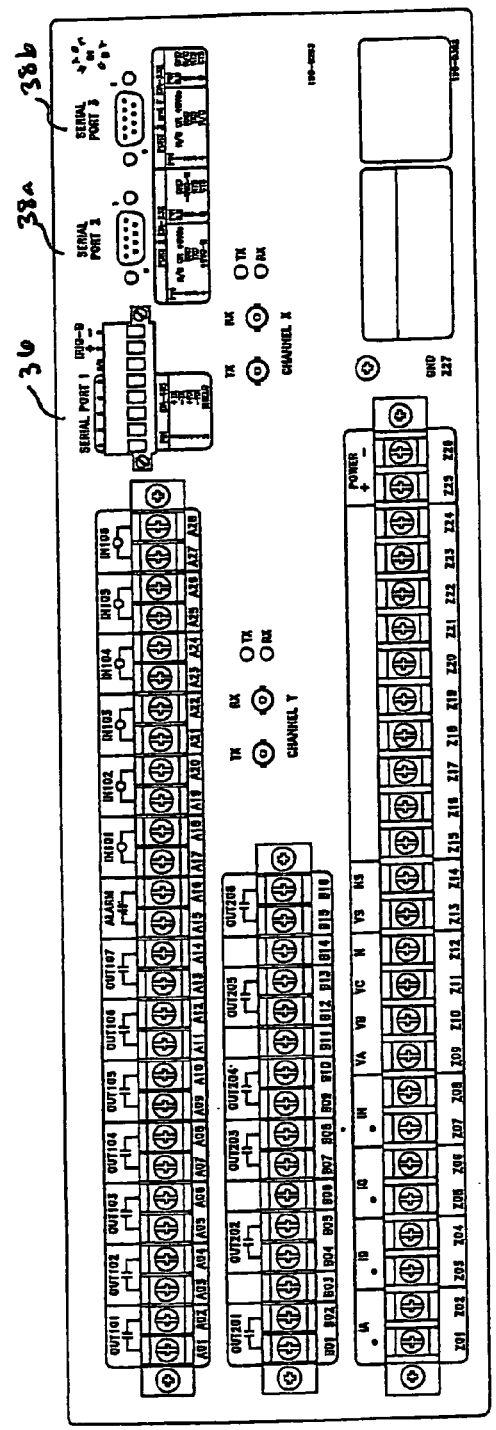
FIG. 4 is a rear view of a protective relay for performing a sync-check adapted for use in the present invention circuit arrangement.
Figure 5:
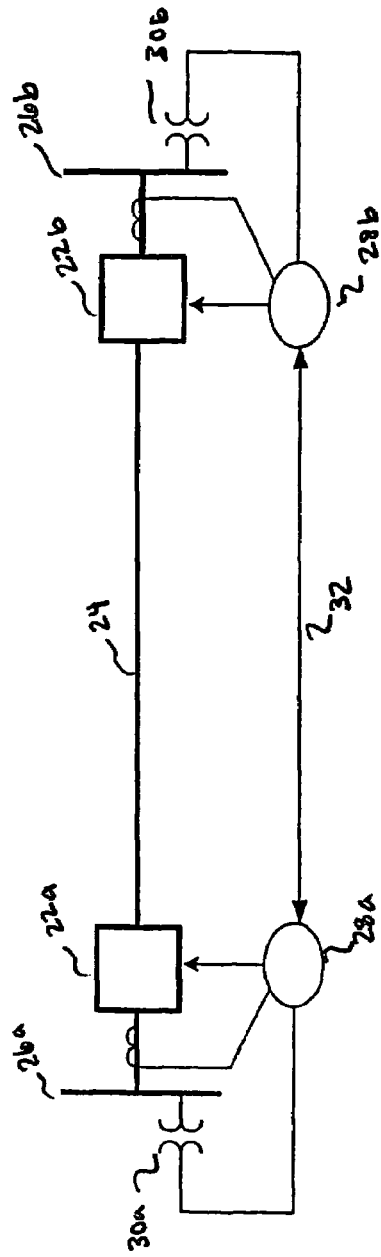
FIG. 5 is a schematic drawing showing the present invention circuit arrangement.

FIGS. 3 and 4 illustrate a protective relay which is adapted for performing a sync-check prior to the closing of a circuit breaker in accordance with the present invention even when voltage transformers are not connected to one side of the circuit breaker. FIG. 5 illustrates how this protective relay is used to perform sync-checks in such an arrangement. More specifically, two power circuit breakers 22a, 22b are connected by a power transmission line 24. Each circuit breaker 22a, 22b is respectively further connected to a bus 26a, 26b and a protective relay 28a, 28b such as that illustrated in FIGS. 3 and 4. The circuit further comprises voltage transformers 30a, 30b between the bus 26a, 26b and the protective relay 28a, 28b.

Figure 2:
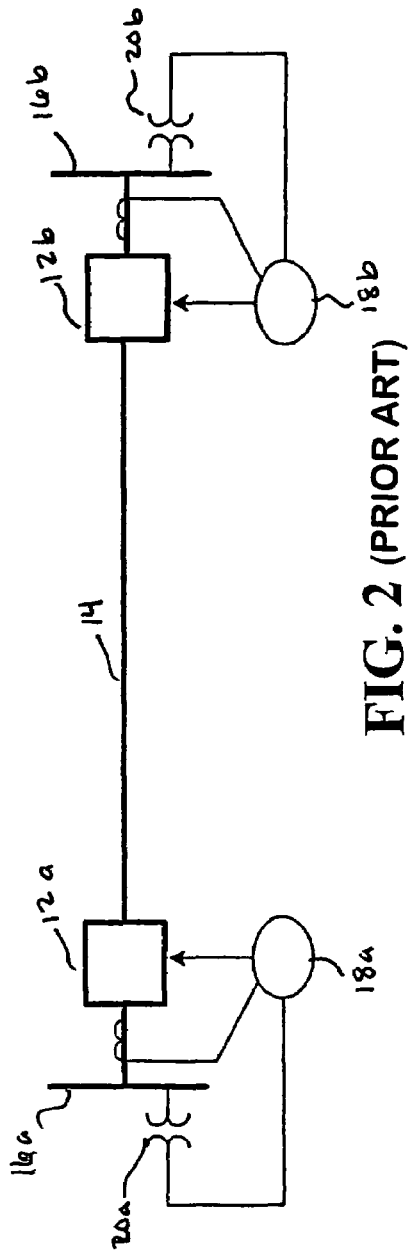
FIG. 2 is a schematic drawing showing a prior art circuit arrangement incapable of power system synchronization having a voltage transformer on one side of each respective circuit breaker.

Nevertheless, similar to FIG. 2, voltage transformers are not installed on the line 24 connecting the two circuit breakers. In this arrangement, the protective relays 28a, 28b monitor the voltages on the bus 26a, 26b side of the circuit breakers 22a, 22b and current flowing through the circuit breakers 22a, 22b in order to detect short circuits on the line. When the protective relays 28a, 28b detect a short circuit, they send a trip signal to the circuit breakers 22a, 22b which causes the circuit breakers 22a, 22b to open. The protective relays 28a, 28b do not monitor any voltage from the line 24 side of the circuit breaker 22a, 22b.

In order to allow for a sync-check, the arrangement of FIG. 5 further comprises a bidirectional communications link 32 for connecting protective relays 28a, 28b together. The bidirectional communications link 32 may further exchange a single bit of information such as in permissive overreaching transfer tripping schemes and direction comparison blocking schemes between each protective relay 28a, 28b. Moreover, the bidirectional communications link may further exchange information relating to the current flowing through each power circuit breaker, such as in current differential protection. In general, the bidirectional communications link 32 provides for more sensitive, more reliable, and faster communication between the protective relays 28a, 28b.

Referring back to FIGS. 3 and 4, the bidirectional communications link 32 is connected to each protective relay 28a, 28b via a serial port having a standard EIA-485 port 36 or EIA-232 Port 38a, 38b, 38c (also called RS-232). The preferred embodiment is fiber-optic channels X and Y (TX and RX) for optical equipment. For example and as shown in FIG. 4, the EIA-485 36 port having eight terminals may be adapted to communicate the data for the following functions as shown in Table I:

TABLE I

| Terminal | Function |
|---|---|
| 1 | +TX (Transmit Data) |
| 2 | −TX (Transmit Data) |
| 3 | +RX (Receive Data) |
| 4 | −RX (Receive Data) |
| 5 | SHIELD (Grounded Shield) |
| 6 | N/C (No Connection) |
| 7 | +IRIG-B (Time-Code) |
| 8 | −IRIG-B (Time-Code) |

Alternatively, the EIA-232 Ports 38a, 38b, 38c use DB-9 or DB-25 connectors as the physical interfaces. As shown in FIGS. 3 and 4, the EIA-232 Ports 38a, 38b, 38c may have nine terminals and be adapted to communicate the data for the following functions as shown in Table II:

TABLE II

| Pin | Function 38a | Function 38b | Function 38c |
|---|---|---|---|
| 1 | N/C or +5 Vdc[a] (No Connection) or (5 Vdc Power Connection) | N/C or +5 Vdc[a] (No Connection) or (5 Vdc Power Connection) | N/C (No Connection) |
| 2 | RXD (Receive Data) | RXD (Receive Data) | RXD (Receive Data) |
| 3 | TXD (Transmit Data) | TXD (Transmit Data) | TXD (Transmit Data) |
| 4 | +IRIG-B (Time-Code) | N/C (No Connection) | N/C (No Connection) |
| 5, 9 | GND (Ground) | GND (Ground) | GND (Ground) |
| 6 | −IRIG-B (Time-Code) | N/C (No Connection) | N/C (No Connection) |

TABLE II-continued

| Pin | Function 38a | Function 38b | Function 38c |
|---|---|---|---|
| 7 | RTS(Request to Send) | RTS(Request to Send) | RTS(Request to Send) |
| 8 | CTS (Clear to Send) | CTS (Clear to Send) | CTS (Clear to Send) |

In addition to providing multiple functions, it is contemplated that these serial ports may further be adapted or other types of serial ports which may further be used to communicate with a number of different bidirectional communications links for performing a sync-check function. For example, the protective relays 28a, 28b may be adapted to accommodate power-line carriers which use low radio frequency energy transmitted via the power line itself; wireline (pilot wire) which uses dc or audio frequency tones applied via a leased or privately owned telephone line; or a microwave radio which uses beamed radio signals over line-of-sight paths between terminals. It is also contemplated that fiber optic cables may also be used for their ability to achieve effective communication at long distances.

In order to perform the sync-check function, the protective relays 28a, 28b use the bidirectional communications link 32 to exchange information relating to the voltages measured by each protective relay 28a, 28b on the bus 26a, 26b of each of the power circuit breakers 22a, 22b. The present invention generally uses the bidirectional communications link to exchange a single voltage from multiple conductors, positive-sequence voltage, or all voltages from multiple conductors, to perform the sync-check function.

Figure 6:
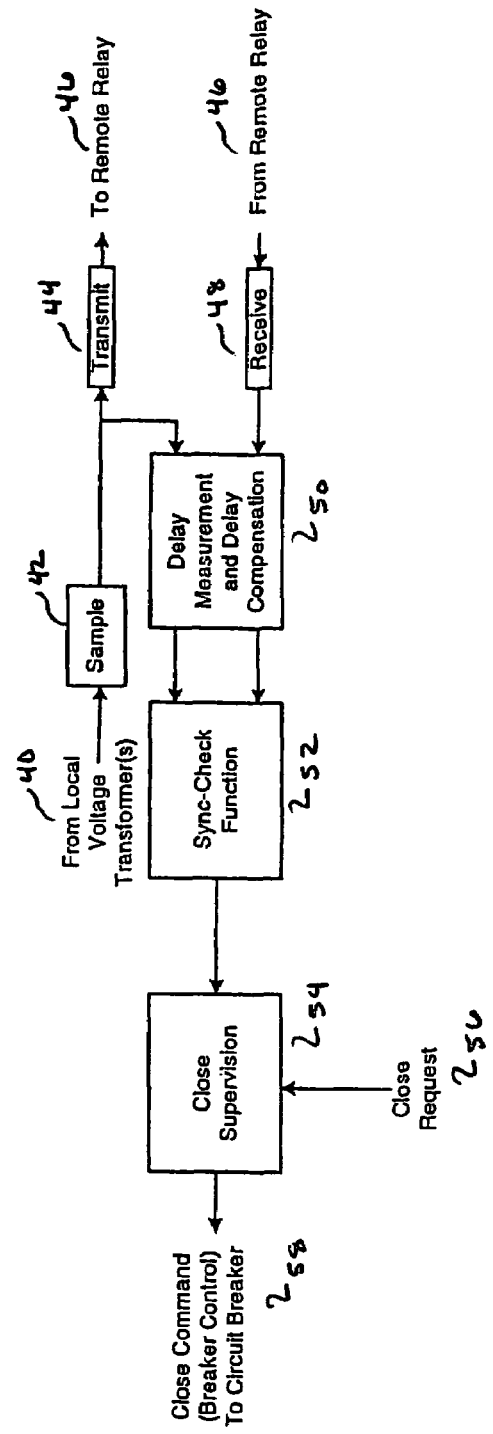
FIG. 6 is a block diagram showing a system for performing a sync-check function where one or more conductor voltages from each bus are used based on locally and remotely sampled signals.
Figure 7:
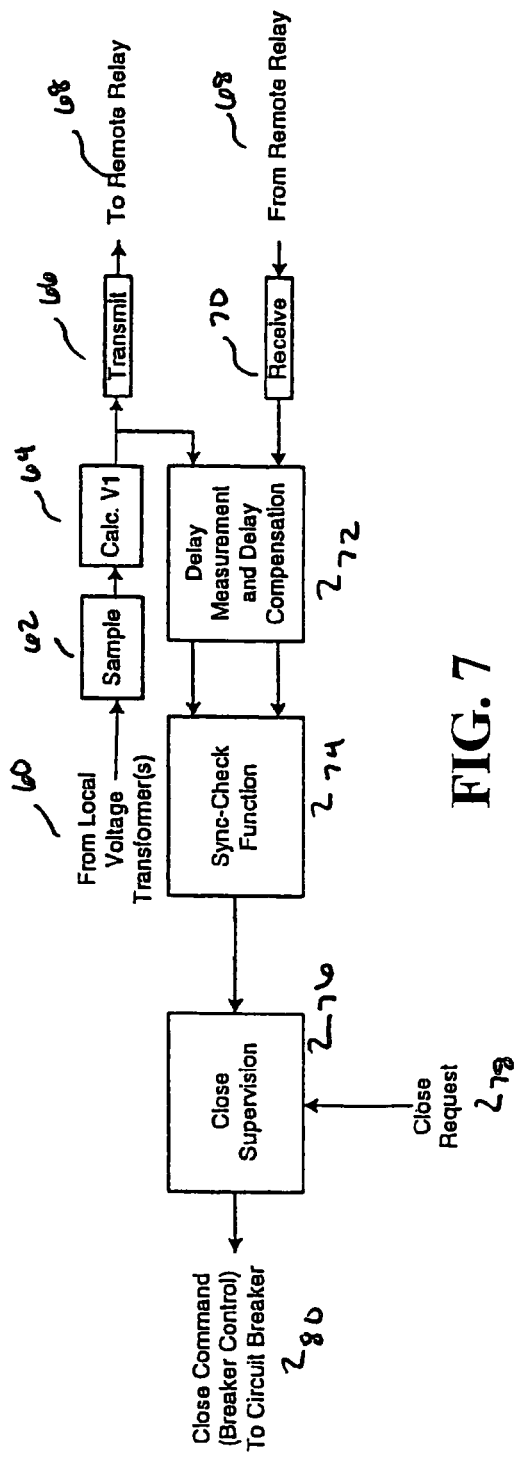
FIG. 7 is a block diagram showing an alternate embodiment system for performing a sync-check function where a composite of voltages from each bus is used based on locally and remotely sampled positive sequence voltage signals.
Figure 8:
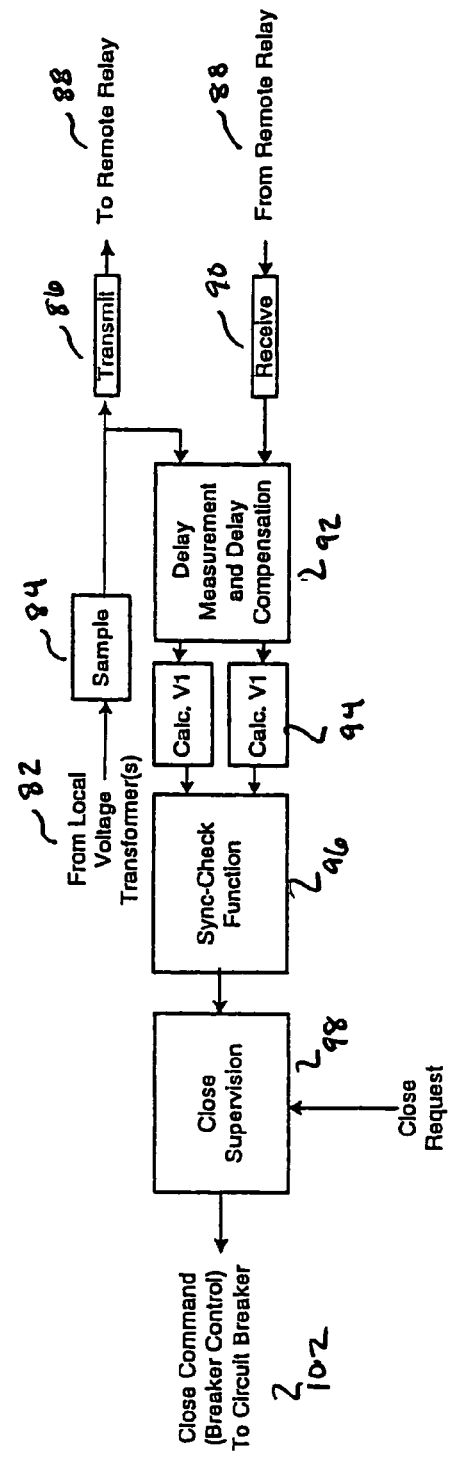
FIG. 8 is a block diagram showing an alternate embodiment system for performing a sync-check function where a composite of voltages from each bus is used on based positive sequence voltage signals calculated from transmitted/received voltage samples.

FIGS. 6, 7, and 8 describe embodiments in which a bidirectional communications link may be used with a protective relay in performing a sync-check. In FIGS. 6, 7 and 8, the internal features contained within the local relay are designated by a box. All features not enclosed by a box are external components which communicate with the local relay (i.e. the remote relay as designated by 46, 68, and 88).

Now referring to FIG. 6 illustrated is an arrangement for performing a sync-check function where one or more conductor voltages from each bus are used. Generally, this arrangement uses locally and remotely sampled voltage signals. More specifically, the voltages necessary for the sync-check function are sampled by a sampling system. Such a sampling system comprises at least a step-down voltage transformer 40. It may also include an anti-aliasing low-pass filter and an analog-to-digital converter (A/D converter). The samples 42 from the sampling system are then processed by the local relay. These samples 42 are then transmitted by the transmit block 44 of the local relay to a remote relay 46. Referring back to FIGS. 3 and 4 and Tables I and II, this transmit block is designated by terminals 1 and 2 of the EIA-485 port 36 and pin 3 of each EIA-232 Port 38a, 38b, 38c.

The remote relay 46 performs an identical function, and the samples transmitted by the remote relay 46 are received by the receive block 48 of the local relay and processed by the local relay. Once again referring back to FIGS. 3 and 4 and Tables I and II, this receive block is designated by terminals 3 and 4 of the EIA-485 port 36 and pin 2 of each EIA-232 Port 38a, 38b, 38c.

The samples transmitted to the remote relay 46 and the samples received from the remote relay 46 may be additionally processed by the local relay to compensate for the processing and communications channel delay 50 between the voltage samples from the two protective relays. For example, as described in U.S. patent application Ser. No. 09/827,513, the local data may be first sampled at an original sampling rate and then resampled at a first resampling rate which is equal to the framing rate for transmitting the data to the remote source. The resampled local source data may be then delayed by the transmission time between the local and remote data sources. The data from the remote relay which is resampled at the remote source at the first resampling rate and the delayed resampled data at the local source may be both resampled at a second resampling rate, at an original rate, to produce aligned data at the local source.

As described in U.S. patent application Ser. No. 09/971,060, delay between the current samples from the two protective relays may alternatively be compensated by ensuring that the voltage waveform at each relay is sampled simultaneously and labeling each sample with the time it was taken. In this manner, only samples with identical time labels are then compared to each other. This method is preferable if the relays are designed such that they both take samples of voltage waveforms simultaneously. It is important to note that other known methods for compensating for delay may be used herewith.

After delay between the voltage samples are compensated for 50, the resulting local and remote voltages are then used by the local relay to perform a sync-check function 52. During the sync-check, attributes of one voltage sample are compared to the same attributes of the second voltage sample. For example, a sync-check may compare the vector difference of the voltages on the two sides of the circuit breaker. Other systems for performing sync-checks may also be utilized herewith.

If the sync-check function 52 determines that the voltages are synchronized, a signal is sent to close supervision logic 54. Upon receiving the signal from the sync-check function 52 and an external circuit breaker close request 56, the close supervision will send a close command to the circuit breaker 58. For additional security, the external close request 56 functions to prohibit any inadvertent closing of the circuit by the protective relay. It is important to note that the remote relay 46 may also comprise the same sample, transmit, receive, delay measurement, delay compensation, sync-check function, and close supervision features and work concurrently with the local relay as shown in detail in FIG. 6 in order to control its respective circuit breaker.

FIG. 7 illustrates an arrangement for performing a sync-check function where a composite of voltages from each bus is used. Generally, this arrangement uses positive-sequence voltage signals to check for synchronization between the sets of multiple-phase bus voltages before closing the circuit breaker.

More specifically, local voltages are sampled via a sampling system comprising at least a voltage transformer 60 as described in FIG. 7. The voltage samples 62 are then used to calculate positive-sequence voltage 64. As described in more detail with regard to FIG. 7, the positive-sequence voltage 64 from the sampling system are then processed by the local relay. This positive-sequence voltage sample is then transmitted by the transmit block 66 of the local relay to a remote relay 68. The remote relay 68 performs an identical function, and the positive-sequence samples transmitted by the remote relay 68 are received by the receive block 70 of the local relay and processed by the local relay.

The positive-sequence samples transmitted to the remote relay 68 and the positive-sequence samples received from the remote relay 68 may be additionally processed by the local relay in processing block 72 to compensate for the processing and communications channel delay. After delay between the positive-sequence voltage samples are compensated for 72, the resulting positive-sequence voltages are then used to perform a sync-check function 74. If the sync-check function 74 determines that the positive-sequence voltages are synchronized, a signal is sent to close supervision logic 76. Upon receiving the signal from the sync-check function 74 and a circuit breaker close request 78, the close supervision will send a close command to the circuit breaker 80.

Once again, it is important to note that the remote relay 68 may also comprise the same sample, positive voltage calculation, transmit, receive, delay measurement, delay compensation, sync-check function, and close supervision features and work concurrently with the local relay as shown in detail in FIG. 7 in order to control its respective circuit breaker.

FIG. 8 illustrates another arrangement for performing a sync-check function where a composite of voltages from each bus is used. Generally, this arrangement uses positive-sequence voltage signals to check for synchronization between the sets of multiple-phase bus voltages before closing the circuit breaker.

More specifically, local voltages are sampled via a sampling system comprising at least a voltage transformer 82 as described in FIG. 6. As more specifically described with regard to FIG. 6, the voltage samples 84 from the sampling system are then processed by the local relay. These samples are then transmitted by the transmit block 86 of the local relay to a remote relay 88. The remote relay 88 performs an identical function, and the samples transmitted by the remote relay 88 are received by the receive block 90 of the local relay and processed by the local relay.

The samples transmitted to the remote relay 88 and the positive-sequence samples received from the remote relay 88 may be additionally processed by the local relay in processing block 92 to compensate for the processing and communications channel delay. After delay between the voltage samples is compensated for 92, positive-sequence voltages for each sample are then calculated 94. The resulting positive-sequence voltages are then used to perform a sync-check function 96. If the sync-check function 96 determines that the positive-sequence voltages are synchronized, a signal is sent to close supervision logic 98. Upon receiving the signal from the sync-check function 96 and a circuit breaker close request 100, the close supervision will send a close command to the circuit breaker 102. Once again, it is important to note that the remote relay 88 may also comprise the same sample, positive sequence voltage calculation, transmit, receive, delay measurement, delay compensation, sync-check function, and close supervision features and work concurrently with the local relay as shown in detail in FIG. 8 in order to control its respective circuit breaker.

It will also be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A synchronization system for checking synchronization of AC voltage sources on power transmission lines, said synchronization system comprising:
    a first and second circuit breaker for opening and closing an AC circuit associated with the power transmission lines,
    a first and second voltage transformer wherein said first and second voltage transformers transmit voltage attributes of the AC circuit associated with said first circuit breaker and second circuit breaker, respectively,
    a first and second protective relay individually communicating with said first and second voltage transformers, respectively, wherein said first and second protective relays are adapted to exchange the voltage attributes transmitted by said first and second voltage transformers,
    a bidirectional communications link connecting said first and second protective relays, wherein said first and second protective relays are adapted to exchange the voltage attributes transmitted by said first and second voltage transformers via said bidirectional communications link,
    said first and second protective relay each further comprising a sync-check function for comparing the voltage attributes transmitted by said first and second voltage transformers.

2. The synchronization system of claim 1, wherein said first and second protective relays further comprise a function for compensating for delay.

3. The synchronization system of claim 1, further adapted to receive an external close request.

4. The synchronization system of claim 1, wherein said first and second protective relays further comprise a function for calculating a positive-sequence voltage from a composite of multiple voltages.

5. The synchronization system of claim 1, further comprising a first and second bus between said first and second voltage transformer and said first and second circuit breaker, respectively.

6. The synchronization system of claim 1, wherein said first and second protective relays further comprise a serial port for connecting said bidirectional communications link.

7. The synchronization system of claim 6, wherein said serial port is an EIA-232 serial port.

8. The synchronization system of claim 7, wherein said EIA-232 serial port comprises DB-9 connectors.

9. The synchronization system of claim 7, wherein said EIA-232 serial port comprises DB-25 connectors.

10. The synchronization system of claim 6, wherein said serial port is an EIA-485 port.

11. The synchronization system of claim 1, wherein said bidirectional communications link is a fiber optic communications link.

12. The synchronization system of claim 1, wherein said bidirectional communications link is a wire-line or pilot wire link.

13. The synchronization system of claim 1, wherein said sync-check function is further adapted to signal each respective circuit breaker to open or close the AC circuit associated therewith.

14. A process for checking AC voltage synchronization of an AC circuit having a first circuit breaker and a local protective relay associated therewith and a second AC circuit having a second circuit breaker and a remote protective relay associated therewith, comprising:
    sampling voltage attributes of the AC circuit associated with said first circuit breaker using said local relay,
    sampling voltage attributes of the AC circuit associated with said second circuit breaker using said remote relay, receiving from the remote relay the voltage attributes of the AC circuit associated with said second circuit breaker via a bidirectional communications link using the local relay, and comparing the voltage attributes of the AC circuit associated with said first circuit breaker using said local relay with the voltage attributes of the AC circuit associated with said second circuit breaker using said remote relay using the local relay.

15. The process of claim 14, further comprising measuring and compensating for delay between the voltage attributes sampled by the local relay and voltage attributes sampled by the remote relay.

16. The process of claim 14, further comprising closing the first circuit breaker when the voltage attributes of the local relay are synchronized with the voltage attributes of the remote relay.

17. A synchronization system for checking synchronization of AC voltage sources on power transmission lines, wherein said power transmission lines connect to a first and second circuit breaker for opening and closing an AC circuit associated therewith, said first and second circuit breakers further communicating with a first and second voltage transformer, respectively, wherein said first and second voltage transformers sample the voltage attributes of the AC circuit associated with said first circuit breaker and second circuit breaker, respectively, said synchronization system comprising:

a first and second protective relay individually communicating with said first and second voltage transformers, respectively, wherein said first and second protective relays are adapted to exchange the voltage attributes transmitted by said first and second voltage transformers, a bidirectional communications link connecting said first and second protective relays, wherein said first and second protective relays are adapted to exchange the voltage attributes transmitted by said first and second voltage transformers via said bidirectional communications link, said first and second protective relay each further comprising a sync-check function for comparing the voltage attributes transmitted by said first and second voltage transformers.

18. The synchronization system of claim 17, wherein said first and second protective relays further comprise a function for compensating for delay.

19. The synchronization system of claim 17, further adapted to receive an external close request.

20. The synchronization system of claim 17, wherein said first and second protective relays further comprise a function for calculating a positive-sequence voltage from a composite of multiple voltages.

21. The synchronization system of claim 17, wherein said first and second protective relays further comprise a serial port for connecting said bidirectional communications link.

22. The synchronization system of claim 21, wherein said serial port is an EIA-232 serial port.

23. The synchronization system of claim 22, wherein said EIA-232 serial port comprises DB-9 connectors.

24. The synchronization system of claim 22, wherein said EIA-232 serial port comprises DB-25 connectors.

25. The synchronization system of claim 21, wherein said EIA-485 port.

26. The synchronization system of claim 17, wherein said bidirectional communications links is a fiber optic communications link.

27. The synchronization system of claim 17, wherein said bidirectional communications link is a wire-line or pilot wire link.

28. The synchronization system of claim 17, wherein said sync-check function is furhter adapted to signal each respective circuit breaker to open or close the AC circuit associated therewith.

29. The process of claim 14, further comprising measuring and compensating for delay between sample times of the voltage attributes sampled by the local relay and voltage attributes sample by the remote relay.

* * * * *